US007363208B2

(12) United States Patent
Cao (10) Patent No.: US 7,363,208 B2
(45) Date of Patent: Apr. 22, 2008

(54) POWER CONSUMPTION ESTIMATION

(75) Inventor: Lipeng Cao, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 868 days.

(21) Appl. No.: 10/616,842

(22) Filed: Jul. 10, 2003

(65) Prior Publication Data

US 2005/0008069 A1 Jan. 13, 2005

(51) Int. Cl.
*G06F 17/50* (2006.01)
(52) U.S. Cl. ....................................................... 703/18
(58) Field of Classification Search .................. 703/18
See application file for complete search history.

(56) References Cited

U.S. PATENT DOCUMENTS

| 5,668,732 | A | 9/1997 | Khouja et al. |
| 5,682,320 | A | 10/1997 | Khouja et al. |
| 5,696,694 | A | 12/1997 | Khouja et al. |
| 5,754,463 | A | 5/1998 | Henstrom et al. |
| 6,075,932 | A | 6/2000 | Khouja et al. |
| 7,076,405 | B1* | 7/2006 | Uchino .......................... 703/2 |
| 2003/0097348 | A1 | 5/2003 | Cao |

OTHER PUBLICATIONS

Macii et al., Stream Synthesis For Efficient Power Simulation Based On Spectral Transforms, Jun. 2001, IEEE Transactions on VLSI Systems, vol. 9, Issue 3, pp. 417-426.*
Welch; The Use Of Fast Fourier Transform For The Estimation Of Power Spectra: A Method Based On Time Averaging Over Short, Modified Periodograms; Jun. 1967; IEEE Transactions on Audio and Electroacoustics, vol. 15, Issue 2; ISSN: 0018-9278; pp. 70-73.*
Marculescu et al., Switching Activity Analysis Considering Spatio-temporal Correlations, Nov. 1994, Proc. IEEE/ACM Int. Conf. Computer-Aided Design, San Jose, CA, pp. 294-299.*
Joseph et al., "Run-Time Power Estimation in High Performance Microprocessors," ISLPED'01, Aug. 6-7, 2001, Huntington Beach, California, USA, pp. 135-140.
Wang et al., "Efficient Generation of Timing and Power Polynomial Models from Lookup Tables for SoC Designs," 0-7803-5632, *IEEE*, Feb. 1999, pp. 216-220.

* cited by examiner

*Primary Examiner*—Paul Rodriguez
*Assistant Examiner*—Juan Carlos Ochoa
(74) *Attorney, Agent, or Firm*—David G. Dolezal; James L. Clingan, Jr.

(57) ABSTRACT

A process for deriving a power transfer function of a circuit. The power transfer function can be used to represent the real time power consumption of a circuit based on the status of the inputs. In one embodiment, the power transfer function is derived from frequency domain analysis of signals applied to the inputs of a circuit during tests of the circuit. In one embodiment, the inputs of the circuit are grouped in groups based on a commonality of power consumption of the signals. The inputs may be grouped by clustering squared coherencies associated with the inputs. The transfer function may be implemented in a power monitoring circuit having inputs coupled to the inputs of the circuit to provide a real time estimation of power consumption of the circuit.

28 Claims, 5 Drawing Sheets

POWER CONSUMPTION ESTIMATION

BACKGROUND OF THE INVENTION

1. Field of the Invention

This invention relates in general to integrated circuits and more specifically to power usage estimation for integrated circuits.

2. Description of the Related Art

It may be desirable for some applications to have a real time estimate of power consumption of an integrated circuit or of a portion of an integrated circuit. Power consumption may be measured by measuring the amount of current being consumed. However such a method requires extra circuitry. Furthermore, it may not be possible to measure current consumption for a portion of an integrated circuit.

What is desirable is a system to provide a real time estimate of power consumption for at least a portion of a circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

An impulse response is the consequence of an event over time. A transfer function can be used to represent an impulse response. A power impulse response of an assertion (or other power consuming activity) of a signal at an input of a circuit represents the power consumed by a circuit over time due to the assertion of that signal. A power transfer function can be used to represent the power consumed over time by the assertion of the signal.

Figure 1:
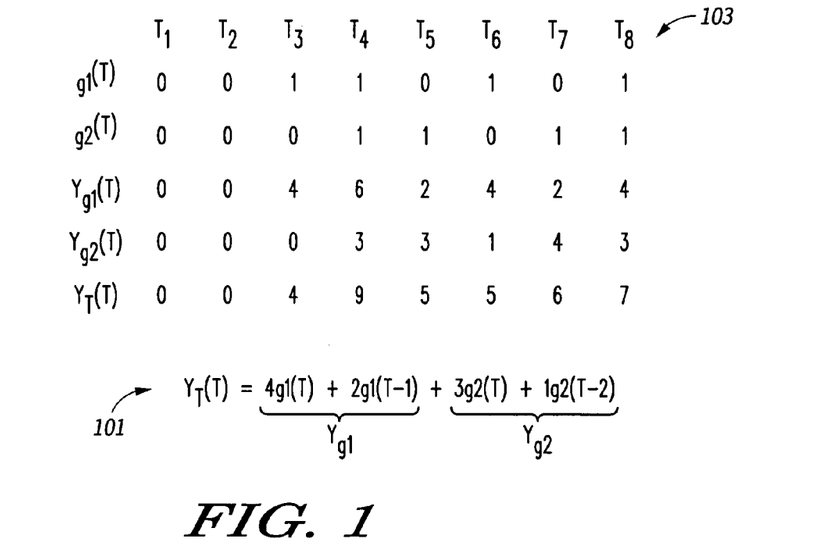
FIG. 1 sets forth one embodiment of a discrete time transfer function and table illustrating concepts of how a transfer function can be used for power consumption estimation of a circuit according to the present invention.

FIG. 1 sets forth a discrete time transfer function and table illustrating concepts of how a transfer function can be used for power consumption estimation of a circuit. Equation 101 is an example of a discrete transfer function which maps activity of groups of one or more input (e.g. g1, g2) of a circuit (not shown) to the total power consumption ($Y_T$) of the circuit based upon the activity of those groups of inputs. In the embodiment shown, each group represents a group of inputs having similar power impulse response functions. $Y_{g1}(T)$ represents an estimation of the component of the power consumption $Y_T(T)$ from the activity of group g1 and $Y_{g2}(T)$ represents an estimation of the component of the power consumption $Y_T$ from the activity of group g2.

The power impulse response for the group g1 inputs as represented by transfer function 101, sets forth that 4 units of power are consumed in the time period (T) that an input of group g1 is at a first state, and 2 units of power are consumed in the next time period (T+1) due to the input of group g1 being at the first state in time period (T). For the inputs of group g2, three units of power are consumed at the time period (T) when an input of group g2 is at a first state and one unit of power is consumed two time periods later (T+2) due to the input of group g2 input being at the first state at time period (T).

Table 103 illustrates an example of how transfer function 101 can be used to provide an estimate of the power consumed by a circuit during time periods T1-T8. A "1" in row g1 (T) or g2(T) represents that an input of that group (g1 or g2) is at a first state during that time period. The numbers in the rows of $Y_{g1}(T)$ and $Y_{g2}(T)$ represent the power consumption at a particular time period due to the inputs of its respective group. $Y_T(T)$ represents the total power consumed by a circuit at a particular time period.

As illustrated by table 103, a g1 input being at a first state at a time period causes four units of power to be consumed during that time period by the circuit and two units of power to be consumed in the next time period (T+1). For example, at time T4, six units of power are being consumed by the circuit due to the inputs of group g1 (as shown in row $Y_{g1}(T)$), four units due to a g1 signal being at a first state at time T4 and two units from a group 1 input being at a first state at time T3 (as represented by the "1" in row g1(T)).

For the embodiment of table 103, the inputs of g1 have two states, a first state which causes the consumption of power by the circuit (indicated by a "1"), and a second state where no power is being consumed (as indicated by a "0"). In other embodiments, a circuit may consume power when the signal is at either state. In such embodiments, non zero numbers may appear in rows g1(T) and g2(T) to represent the second state. Also, transfer function 101 may include portions representing an impulse response from an input being in a second state. Furthermore, although not shown in table 103, more than one signal of a group may be at the power consuming state during a time period. For those instances, the number in that row (e.g. g1(T) or g2(T)) would represent the number of signals of a group at that state.

With other embodiments, the inputs g1 and g2 as shown in table 103 may represent another power consuming activity such as a change in state of an input. Other embodiments may include a different number of input groups.

Figure 2:
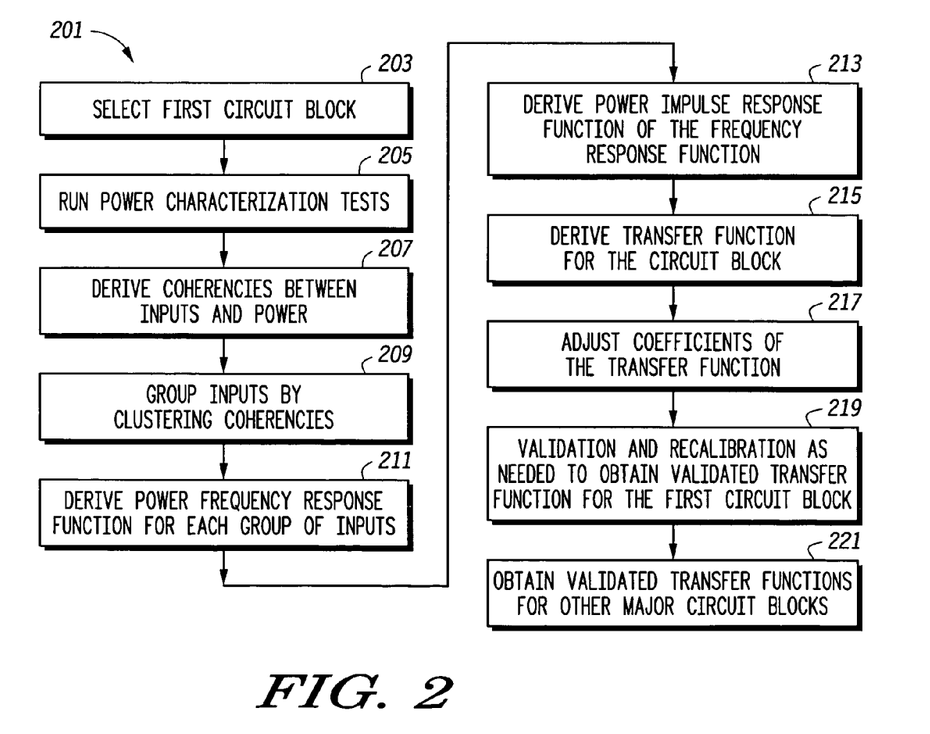
FIG. 2 represents a block diagram of one embodiment of a method of deriving a power transfer function which maps the input activity of a circuit to the power consumption of the circuit according to the present invention.

As can be seen from FIG. 1, a discrete time transfer function can be used to provide an indication of the power consumed by a circuit from the state (or other power consuming activity) of the inputs to the circuit. Accordingly, such a transfer function may be used to provide an estimate of power usage of the circuit in real time based on the state of the inputs. A FIG. 2 represents a block diagram of one embodiment of a method of deriving a power transfer function which maps the input activity of a circuit to the power consumption of the circuit. In one embodiment, the power transfer function derived in method 201 is derived from the results of tests run on a simulated circuit. However, in other embodiments, a power transfer function may be derived from measurements of an actual circuit (not shown).

With the method of FIG. 2, each input is placed into a group of inputs so as to simplify the derived power transfer function. The inputs are grouped based on a commonality of power consumption of the circuit responsive to signals applied to the inputs.

In 203, a first circuit block (not shown) of an integrated circuit is selected for deriving a power transfer function. In 205, at least one power characterization test is run where signals are applied to the inputs of the circuit block to perform functions of the circuit block. In some embodiments, the signals applied are signals for performing normal or expected operations of the circuit block. During the tests, the power consumption of the circuit block is recorded over time to produce a power consumption log which shows the power consumed as a function of time. In one embodiment wherein the transfer function is being derived from a circuit simulation, the circuit block is simulated in VERILOG and the power consumption log is obtained from a gate level power analysis methodology.

In one embodiment, the power consumption log is a cycle by cycle power consumption profile of the circuit during the simulated tests. This profile, in one embodiment, is obtained from a combination of profiles of the gate/macro external power consumption and profiles of gate/macro internal power consumption. In one embodiment, profiles of the gate/macro external power consumption are derived from the switching activities of the nets that are connected to inputs and outputs of a simulated circuit during the tests and their associated net capacitances. In one embodiment, the profiles of the gate/macro internal power consumption are derived from the inputs and output of a simulated circuit using appropriate power models. In one embodiment, such power models are set forth in U.S. Pat. No. 6,910,025 entitled "Modeling Behavior of an Electrical Circuit," having Lipeng Gao as inventor, having a common assignee, having a filing date of Nov. 20, 2001, an application Ser. No. 09/989,325, and a publication number of US 2003/0097348 A1, all of which is hereby incorporated by reference in its entirety. The inputs of the power model are derived from switching activities of the nets of the tests and the associated net capacitances of the inputs and outputs of the simulated circuits. In one embodiment, the models provide representations of both dynamic power consumption and leakage power consumption.

In 207, for each power characterization test, an average squared coherency between each input of the circuit and the power consumed by the circuit as indicated by the power consumption log is derived mathematically from the Fourier transforms of the signals applied to the inputs over time during the test and the Fourier transform of the power consumption as indicated by the power consumption log.

In 209, the inputs having a commonality of power consumption are grouped into groups. In one embodiment of 209, the inputs are grouped by clustering the average squared coherencies. In one embodiment, the average squared coherency for each input from each test is clustered in multi dimensional space having a dimension for each test run. In one embodiment, commonality of power consumption of the circuits for the inputs is determined by the proximity of the averaged squared coherencies in the multidimensional space.

Figure 4:
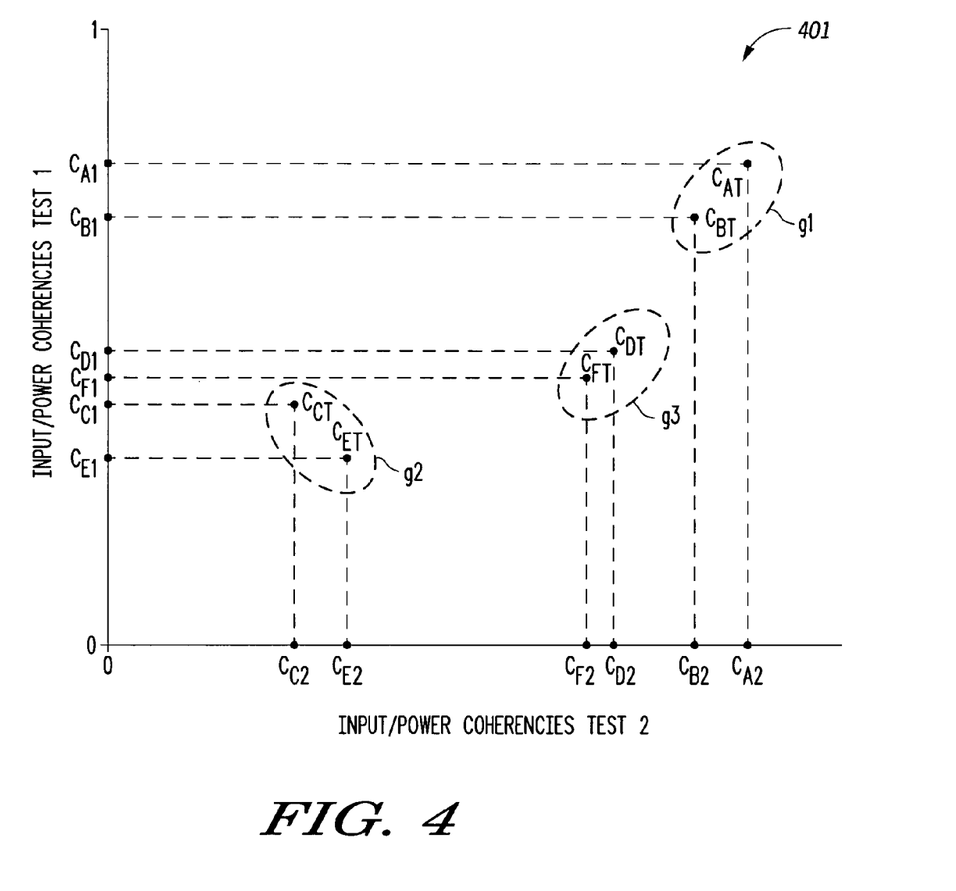
FIG. 4 shows one embodiment of clustering averaged squared coherencies in two dimensional space according to the present invention.

FIG. 4 shows one example of clustering averaged squared coherencies in two dimensional space 401. Two dimensional space 401 is utilized for clustering the average squared coherency for data from two power characterization tests. The average squared coherencies shown in FIG. 4 are derived from two power characterization tests on a circuit (not shown) having inputs A, B, C, D, E, and F. $C_{A1}$, $C_{B1}$, $C_{C1}$, $C_{D1}$, $C_{E1}$, and $C_{F1}$ (as shown on the Y axis) represent the average squared coherencies with respect to power consumption derived for inputs A, B, C, D, E, and F for a first power characterization test and $C_{A2}$, $C_{B2}$, $C_{C2}$, $C_{D2}$, $C_{E2}$, and $C_{F2}$ (as shown on the X axis) represent the average squared coherencies with respect to power derived for inputs A, B, C, D, E, and F for a second power characterization test. $C_{AT}$, $C_{BT}$, $C_{CT}$, $C_{DT}$, $C_{ET}$, and $C_{FT}$ represent the total averaged squared coherency of both test cases in multidimensional space 401. In the embodiment shown, the inputs are grouped for commonality by the proximity of the average squared coherencies to one another in the two dimensional space. Inputs A and B are grouped in group 1, inputs C and E are grouped in group 2, and inputs D and F are grouped together in group 3. Depending upon the proximity requirements for a group, Some groups may have only one input depending upon the proximity of its average squared coherency to the other average squared coherencies.

Referring back to FIG. 2, in 211, a frequency response function between the power consumed by the circuit and each group is derived. In 213, power impulse response functions for each group are derived from the frequency response functions derived in 211. In 215, a power transfer function is mathematically derived from the impulse response functions derived in 213. This derived power transfer function includes a model for each group of inputs. Each model is derived from the impulse response function derived for each group of inputs. Each model includes a formula with adjustable coefficients of initial values. In 217, the coefficients are further adjusted using conventional non linear optimization techniques such as BFGS (Broyden, Flechter, Goldfarb, and Shannon), a quasi-Newton algorithm.

Figure 6:
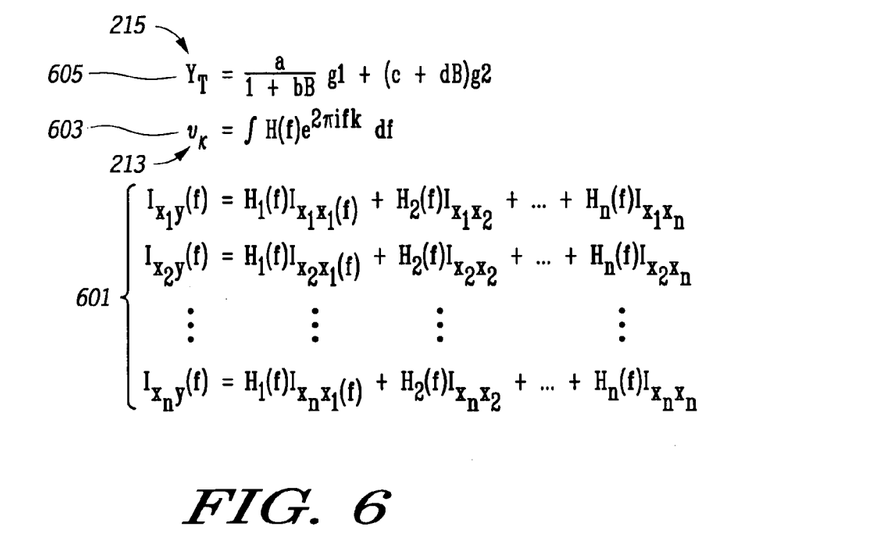
FIG. 6 sets for one embodiment of equations according to the present invention.

Referring to FIG. 6, equation 605 sets forth an example of a transfer function for a circuit having two groups of inputs (g1 and g2). "B" in equation 605 represents a delay operator which has the effect of delaying the quantity for one time period. The designations a, b, c, and d in 605 are adjustable coefficients. The model for group g1 in equation 605 is a first order discrete transfer function (a/(1+bB)) and the model for group g2 is a 0 order discrete transfer function (c+dB). Models of other orders of transfer functions in rational function polynomial formats may be used in other embodiments. The model used for each group is based on the impulse response function for each group derived in 213. In some embodiments, the impulse response function is used to identify the type and number of parameters in the rational function. Non linear techniques may be used to evaluate the value of the parameters.

Referring back to FIG. 2, in 219, the derived power transfer function with the adjusted coefficients is validated. In one embodiment, the power transfer function is validated by comparing the results of a power consumption estimation from the power transfer function with the power consumption as measured in the power consumption logs. In another embodiment, the results of the power consumption estimation can be compared with laboratory test results obtained from an actual circuit. If the validation results are not satisfactory (e.g. % 10 or less), in some embodiments, the inputs in 209 may be regrouped and operations 211 through 219 are repeated. In other embodiments, if the validation results are not satisfactory, the coefficients of the power transfer function may be readjusted in 217 and operation 219 is repeated. Still in other embodiments, new models may be utilized in 215 with operations 217 and 219 repeated.

If the circuit block is part of a larger circuit, then in 221, validated transfer functions are obtained for other circuit blocks of the circuit utilizing operations 203-219 as shown in FIG. 2.

Figure 3:
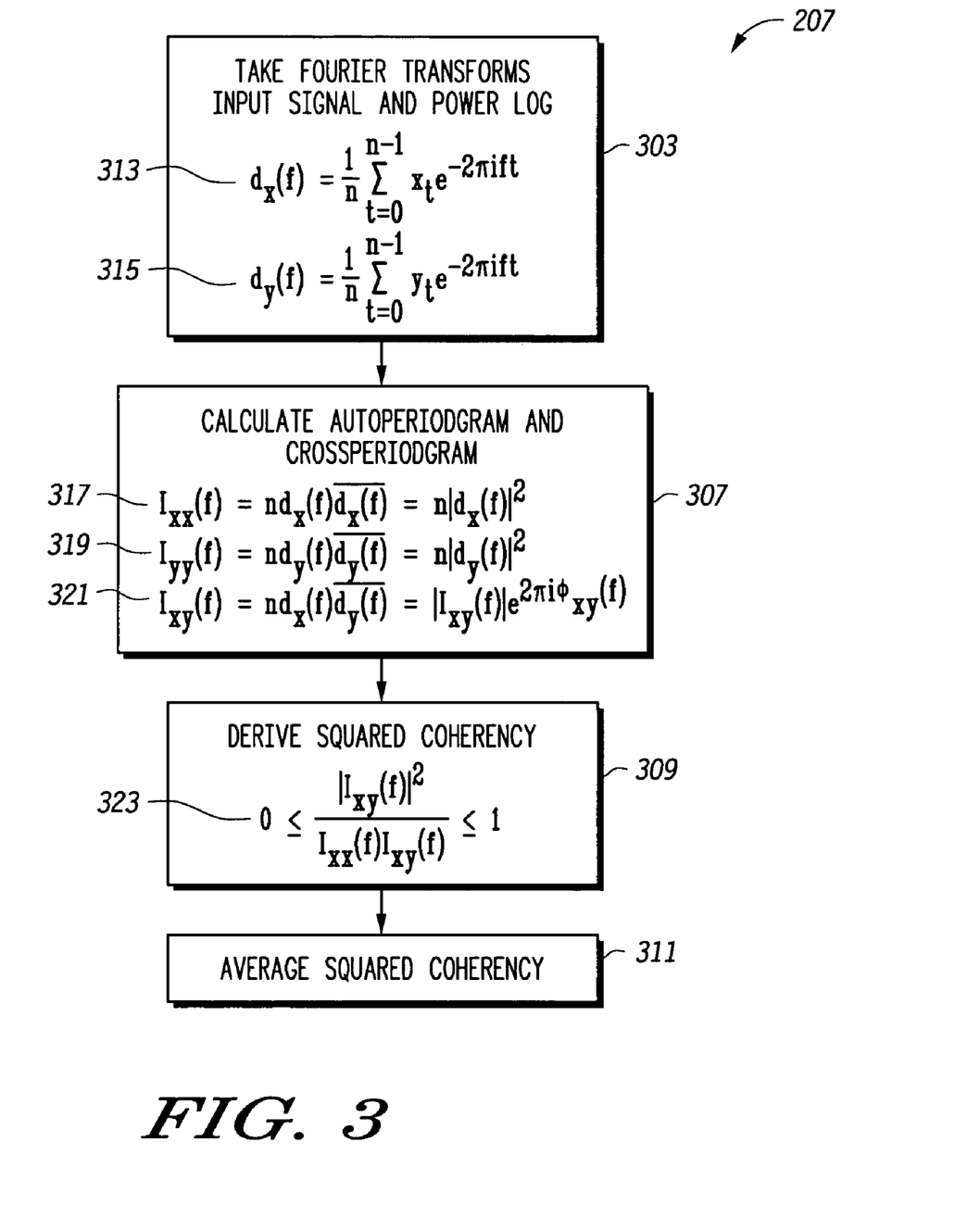
FIG. 3 is a block diagram of one embodiment of operation 207 of FIG. 2 showing equations utilized for obtaining coherencies from the results of the power characterization tests according to the present invention.

FIG. 3 is a block diagram of one embodiment of operation 207 showing equations utilized for obtaining coherencies from the results of the power characterization tests. In 303, a Fourier transform (equation 313) is made for each signal applied to an input for each test to convert that signal to the frequency domain. A Fourier transform (equation 315) is made of each power consumption log for each test to convert those logs into the frequency domain. In FIG. 3, X represents an input, and Y represents power.

In 307, each Fourier transform of a signal applied to an input (obtained in 303) is used to derive an autoperiodgram ($I_{xx}(f)$) (equation 317) for an input for each test. Also, the Fourier transform of each power consumption log of each test is used to derive an autoperiodgram ($I_{yy}(f)$) (equation 319) for the power consumed for each test. Additionally in 307, for each test, the Fourier transform of a signal applied to an input and the Fourier transform of the power consumption log are used to derive a cross periodgram ($I_{xy}(f)$) for each input of the circuit (see equation 321). In 309, for each input of each test, a squared coherency (which is a function of frequency (f)), is derived using the results derived in 307 (see Equation 323). As shown in 309, each squared coherency is a value between 0 and 1. In 311, for each input of each test, the squared coherency is averaged over all frequencies to obtain an average squared coherency of the input with respect to power. In other embodiments, the squared coherency is averaged over selected frequency bands. See FIG. 4 showing the average squared coherencies for test 1 located on axis Y and showing the averaged squared coherencies for test 2 on axis X.

Figure 5:
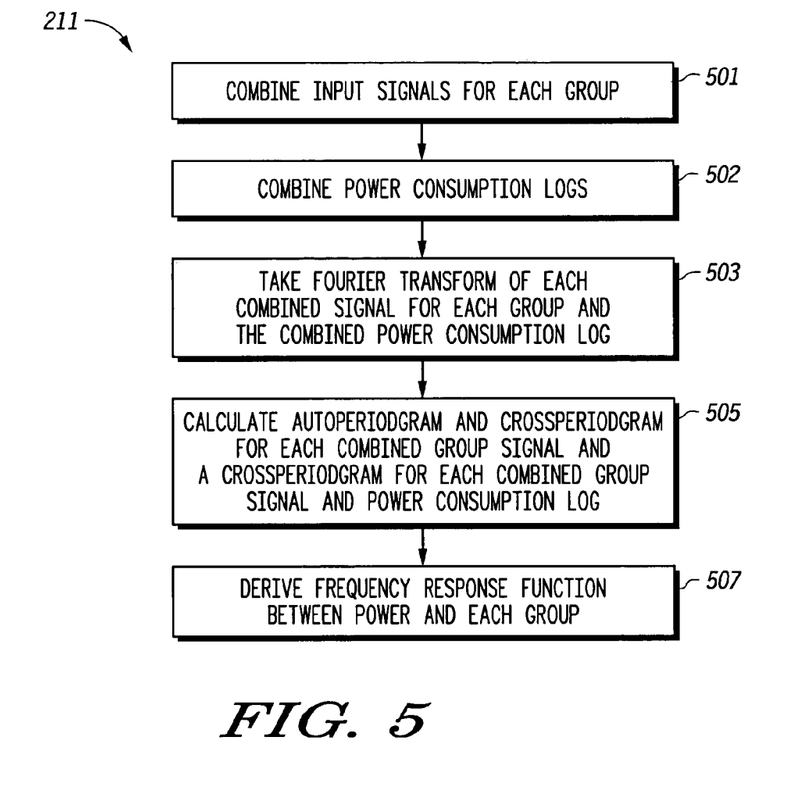
FIG. 5 sets forth one embodiment of a block diagram of operation 211 of FIG. 2 for deriving a power frequency response for each group of inputs according to the present invention.

FIG. 5 sets forth a block diagram of operation 211 for deriving a power frequency response function for each group of inputs. In 501, the signals applied to each input of a group for all tests are combined to make one signal. This may be performed by attaching "end to end" the signals applied to an input from each test to make one combined signal. The combined signals of each input of a group are then averaged together to make a combined group signal. In 502, the power logs for the tests are combined to make a combined power consumption log. The power consumption logs are attached "end to end" in the same order as the signals applied to the input. In 503, a Fourier transform of each combined group signal is derived (with an equation similar to equation 313), to convert each of the combined group signals to the frequency domain. Also, a Fourier transform for the combined power consumption log is also derived (see equation 315) to convert the combined power consumption log to the frequency domain.

In 505, for each group, an autoperiodgram of each combined group signal is derived from the Fourier transform of the combined group signal (see equation 317). Also in 505, a crossperiodgram between each input group with respect to the other input groups is derived from the Fourier transforms of the combined group signals. Further in 505, for each group, a cross periodgram (see e.g. equation 323) between each group and power is derived from the Fourier transform of the combined power log and the Fourier transfer of a combined group signal.

In 507, the frequency response function with respect to power for each input group is calculated by solving linear equations 601 of FIG. 6. $H_1(f)$ represents frequency response function for input group one with respect to power. $H_2(f)$ represents the frequency response function for the second input group. Referring to equation 601, $I_{x1x1}(f)$ represents the autoperiodgram for the first input group (derived in 505). $I_{x1x2}(f)$ is the cross periodgram between the first input group and the second input group (derived in 505). $I_{x1y}(f)$ is the crossperiodgram for input group 1 and power.

Referring back to FIG. 2, as stated earlier, in 213, a power impulse response function for each input group is derived from the frequency response function for the input group using equation 603 wherein $V_k$ represents the power impulse response function for each group. As stated earlier, each power input response function is then used to mathematically derive a portion of the transfer function for the circuit block in 215.

Because in some embodiments, the inputs may be grouped according to a commonality of power consumption, the power transfer function derived may be less complex than a transfer function which would include a model for each signal. Accordingly, grouping the inputs may allow for the power consumed to be estimated by a relatively "less complex" transfer function. However, in some embodiments, each signal may have its own model in a transfer function.

In other embodiments, the averaged squared coherencies may be analyzed by other conventional methods to determined a commonality of power consumption of the circuit for the inputs. For example, in some embodiments, the power consumption logs and input signals may be placed back to back to obtain one long test, wherein a single average squared coherency is obtained for each input. The inputs are grouped based upon their proximately of the average squared coherency values.

The derived power transfer function may be utilized for power debugging a designed circuit. For example, a derived transfer function may be used to identify areas for detailed examination of power consumption, evaluate clock efficiency, identify fundamental modes of power consumption for specific circuits of an integrated circuit, and evaluate the power gain of net clusters through transfer function representations. Also the transfer functions may be used to perform large scale mixed mode power simulations. Such transfer functions may also be used for high level power planning and budgeting.

The derived power transfer function may also be utilized to predict power consumption in real time. A transfer function may be implemented in an electronic system to provide an indication of the power being consumed by a circuit of the electronic system. Such an indication may be used to provide the electronic system with real time power estimations to enable the electronic system to perform power monitoring and/or power management functions.

Figure 7:
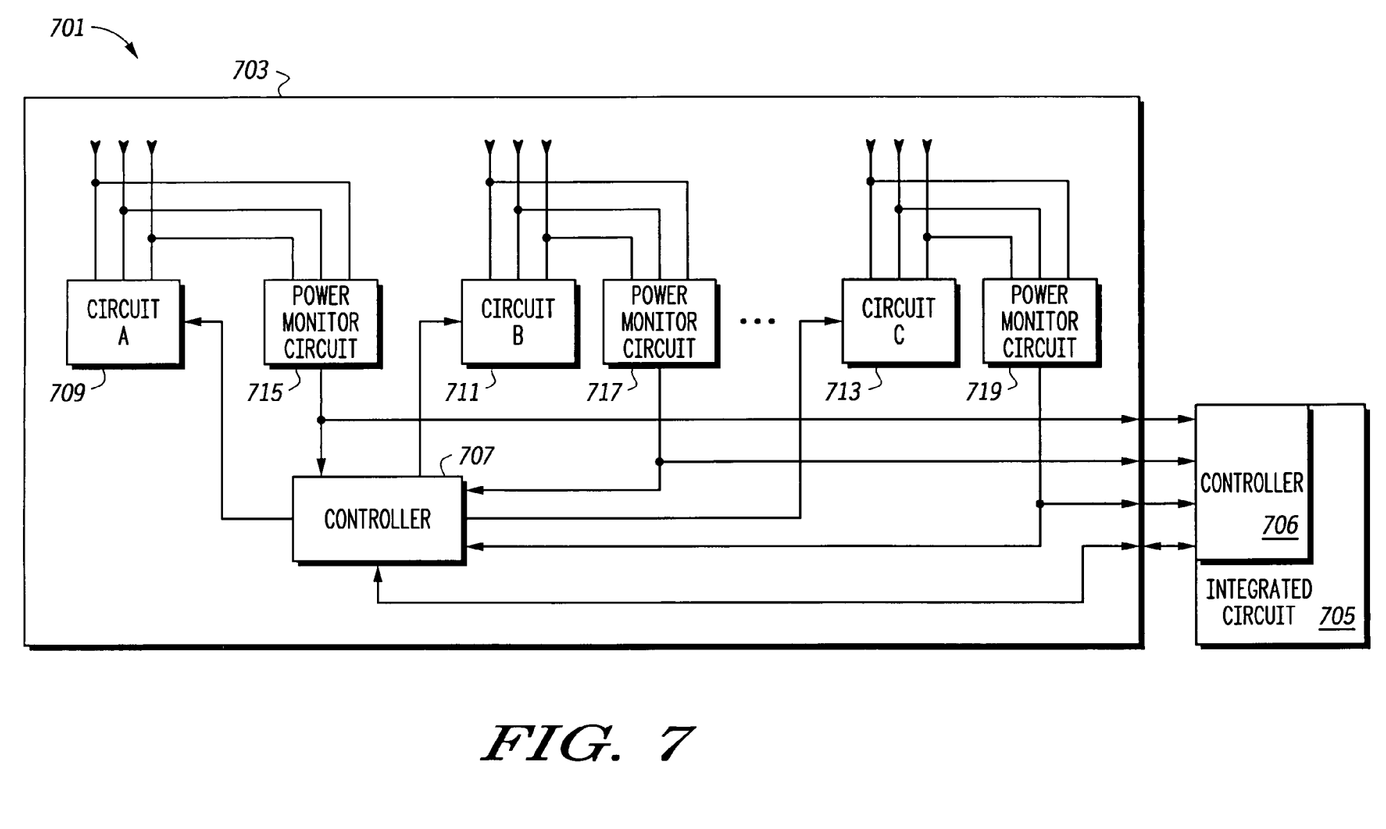
FIG. 7 is a block diagram of a electronic system according to the present invention.

FIG. 7 is a block diagram of a electronic system according to the present invention. System 701 includes a first integrated circuit 703 and a second integrated circuit 705. As an example, electronic system 701 may be one of e.g. a computer system, a cellular phone, other type of wireless device, or other type of electronic system.

Integrated circuit 703 includes circuits 709, 711, and 713 which perform various operations for system 701. In one embodiment, integrated circuit 703 is a microcontroller where circuit 709 is a memory, circuit 711 is a processor core, and circuit 713 is a bus controller. Integrated circuit 703 also includes a power monitor circuit (715, 717, and 719) associated with each circuit (709, 711, and 713). Power monitor circuits 715, 717, and 719 implement a power transfer function for its associated circuit. In one example, the power transfer functions are derived by a method similar to the method set forth in FIG. 2.

Each power monitor circuit has inputs coupled to the inputs of its associated circuit. Each power monitor circuit has at least one output for providing an indication of an estimate of the power being consumed by its associated circuit based upon the signals being applied to the inputs of its associated circuit. In one embodiment, the indication is in digital form. In other embodiments, the indication may be in analog form.

In FIG. 7, the outputs of each power monitor circuit (715, 717, and 719), provides an indication of the power consumed by a circuit block for which a power transfer function was derived by a method similar to that shown in FIG. 2. In other embodiments, the output of each power monitor circuit (715, 717 and 719) provides an indication of the power consumed by a multiple circuit blocks, each of which a power transfer function was derived by a method shown in FIG. 2. In such embodiments, the transfer functions from each circuit block are combined such that the outputs of the power monitoring circuits are indicative of the power consumed by all of the circuit blocks of the associated circuit. In one embodiment, the transfer functions are implemented in the power monitor circuit with an analog filter circuit such as e.g. a switched capacitor circuit.

In another embodiment, the transfer functions are implemented in the power monitor circuits with digital filters.

As shown in FIG. 7 each power monitor circuit can either be coupled to provide an indication of power consumption estimation to an on chip controller 707 or coupled to provide the indication to an off chip controller 706. In some embodiments, on chip controller (707) may combine information from the various power monitor circuits and provide that information to an off chip controller.

Either of these controllers (707, 706) may utilize the power consumption information to control the operation of the components of system 701 to manage the power consumption of electronic system 701. In one embodiment, system 701 is managed such that it consumes only a limited amount of power at any one time. In such a system, certain operations (e.g. accessing a hard drive, transmitting information, performing decoding operations) may be delayed until the power consumed by the circuits (as indicated by the outputs of power monitor circuits 715, 717 and 719) is below a particular threshold.

In other embodiments, the power consumption information may be used for load shedding to reduce power consumption during low power modes (e.g. during a low battery mode). Furthermore, the power consumption information may be used to provide a more accurate estimation of the amount of battery power remaining, in that actual power consumed can be monitored.

Furthermore, because, the transfer functions use delay operators, the power monitoring circuits may be used to provide a forecast of power consumption. Such information may also be used for various power management techniques.

Because the power monitoring circuits 715, 717, and 719 implement transfer functions having models representing groups of inputs, the complexity of the power transfer function may be reduced, thereby reducing the complexity of a power monitor circuit whose outputs provide and indication of the power consumed. In other embodiments, the power monitor circuit may be located off chip from its associated circuit.

In one aspect, the invention includes a method of deriving a power transfer function of a circuit. The method includes running at least one test on a circuit having a plurality of inputs to obtain information on power consumption of the circuit responsive to signals applied to the plurality of inputs. The method also includes grouping the plurality of inputs into groups of at least one input based on a commonality of power consumption of the circuit for the plurality of inputs as determined from the information. The method further includes deriving a power transfer function for providing an estimate of power consumption of the circuit responsive to signals applied to the plurality of inputs of the circuit. The transfer function includes a portion for each group of the groups.

In another aspect of the invention, an apparatus includes a circuit having a plurality of inputs and a power monitor circuit coupled to the plurality of inputs. The power monitor circuit implements a power transfer function. The power monitor circuit has at least one output for providing an indication representative of power consumed by the circuit based upon signals applied to the plurality of inputs.

In another aspect, the invention includes a method of deriving a power transfer function of a circuit. The method includes running at least one test on a circuit having a plurality of inputs to obtain information on power consumption of the circuit responsive to signals applied to the plurality of inputs. The method also includes deriving at least one power impulse function from the information. Each power impulse response of the at least one power impulse response is representative of at least one input of the plurality of inputs. The method also includes deriving a transfer function from the at least one power impulse function.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method of deriving a power transfer function of a circuit, the method comprising:

running at least one test on a circuit having a plurality of inputs to obtain information on power consumption of the circuit responsive to signals applied to the plurality of inputs;

grouping the plurality of inputs into groups of at least one input based on a commonality of power consumption of the circuit for the plurality of inputs as determined from the information;

deriving a power transfer function for providing an estimate of power consumption of the circuit responsive to signals applied to the plurality of inputs of the circuit, wherein the transfer function includes a portion for each group of the groups;

running at least one test on a second circuit having a plurality of inputs to obtain information on power consumption of the second circuit responsive to signals applied to the plurality of inputs of the second circuit;

grouping the plurality of inputs of the second circuit into groups of at least one input of the second circuit based on a commonality of power consumption of the second circuit for the plurality of inputs as determined from the information;

deriving a second power transfer function for providing an estimate of power consumption of the second circuit responsive to signals applied to the plurality of inputs of the second circuit, wherein the second power transfer function includes a portion for each group of the groups of the second circuit.

2. The method of claim 1 wherein the grouping comprises:
deriving at least one coherency for each input of the plurality with respect to power consumption based on the information;
clustering the coherencies to identify the groups.

3. The method of claim 2 wherein the deriving at least one coherency further includes:
deriving, for each input of the plurality and for each test of the at least one test an average squared coherency;
wherein the clustering the coherencies further includes clustering the average squared coherencies.

4. The method of claim 2 wherein the deriving at least one coherency further includes:
taking a Fourier transform applied of each signal applied to each input of the plurality for each test of the at least one test;
taking a Fourier transform of the power consumed for each test of the at least one test;
wherein a coherency of the at least one coherency for each test is derived from the Fourier transform of the signal applied to the input for that test and the Fourier transform of the power consumed for that test.

5. The method of claim 2 further comprising:
simulating the circuit;
wherein the running at least one test on the circuit includes running the at least one test on the simulated circuit.

6. The method of claim 2 further comprising:
implementing the power transfer function in a third circuit wherein the third circuit includes inputs coupled to the inputs of the circuit.

7. The method of claim 1 further comprising:
implementing the power transfer function in a third circuit wherein the third circuit includes inputs coupled to the inputs of the circuit.

8. The method of claim 1 further comprising:
simulating the circuit;
wherein the running at least one test on the circuit includes running the at least one test on the simulated circuit.

9. The method of claim 1 wherein the deriving includes performing frequency domain analysis of the information.

10. The method of claim 1 wherein the grouping includes performing frequency domain analysis of the information.

11. A method of deriving a power transfer function of a circuit, the method comprising:
running at least one test on a circuit having a plurality of inputs to obtain information on power consumption of the circuit responsive to signals applied to the plurality of inputs;
grouping the plurality of inputs into groups of at least one input based on a commonality of power consumption of the circuit for the plurality of inputs as determined from the information;

deriving a power transfer function for providing an estimate of power consumption of the circuit responsive to signals applied to the plurality of inputs of the circuit, wherein the transfer function includes a portion for each group of the groups;
wherein the grouping comprises:
deriving at least one coherency for each input of the plurality with respect to power consumption based on the information;
clustering the coherencies to identify the groups, wherein the clustering the coherencies comprises clustering in multi-dimensional space having a dimension for each test of the at least one test.

12. The method of claim 11 further comprising:
simulating the circuit;
wherein the running at least one test on the circuit includes running the at least one test on the simulated circuit.

13. The method of claim 11 further comprising:
implementing the power transfer function in a second circuit wherein the second circuit includes inputs coupled to the inputs of the circuit.

14. A method of deriving a power transfer function of a circuit, the method comprising:
running at least one test on a circuit having a plurality of inputs to obtain information on power consumption of the circuit responsive to signals applied to the plurality of inputs;
grouping the plurality of inputs into groups of at least one input based on a commonality of power consumption of the circuit for the plurality of inputs as determined from the information;
deriving a power transfer function for providing an estimate of power consumption of the circuit responsive to signals applied to the plurality of inputs of the circuit, wherein the transfer function includes a portion for each group of the groups;
wherein the power transfer function includes coefficients, wherein the deriving the power transfer function further includes:
determining an accuracy of the transfer function; and
changing the coefficients to improve the accuracy of the power transfer function.

15. The method of claim 14 further comprising:
simulating the circuit;
wherein the running at least one test on the circuit includes running the at least one test on the simulated circuit.

16. The method of claim 14 further comprising:
implementing the power transfer function in a second circuit wherein the second circuit includes inputs coupled to the inputs of the circuit.

17. A method of deriving a power transfer function of a circuit, the method comprising:
running at least one test on a circuit having a plurality of inputs to obtain information on power consumption of the circuit responsive to signals applied to the plurality of inputs;
grouping the plurality of inputs into groups of at least one input based on a commonality of power consumption of the circuit for the plurality of inputs as determined from the information;
deriving a power transfer function for providing an estimate of power consumption of the circuit responsive to signals applied to the plurality of inputs of the circuit, wherein the transfer function includes a portion for each group of the groups;

wherein each portion implements a model, wherein the deriving the power transfer function further includes:
deriving, for each group of at least one input, an impulse response function between the signals and the power consumption;
deriving a model for each group from the impulse response function derived for that group.

18. The method of claim 17 wherein the deriving the power transfer function further includes:
deriving, for each group, a frequency response function;
wherein the impulse response function for each group is derived from the frequency response function for the group.

19. The method of claim 17 further comprising:
simulating the circuit;
wherein the running at least one test on the circuit includes running the at least one test on the simulated circuit.

20. The method of claim 17 further comprising:
implementing the power transfer function in a second circuit wherein the second circuit includes inputs coupled to the inputs of the circuit.

21. The method of claim 18 wherein the deriving for each group of at least one input a frequency response function further includes:
combining the signals for each test of the at least one test applied to the inputs of each group to form a combined signal for each group;
taking a Fourier transform of the combined signal for each group and a Fourier transform of the power consumed during the at least one test;
deriving, for each group of inputs, an autoperiodgram, a cross periodgram between the group and each of the other groups, and a cross periodgram between the group and the power consumed from the Fourier transform of each combined signal and the Fourier transform of the power consumed;
solving linear equations including the autoperiodgram, the cross periodgram between the group and each of the other groups, and a cross periodgram between the group and the power consumed for each group to derive the frequency impulse function for each group.

22. A method of deriving a power transfer function of a circuit, the method comprising:
running at least one test on a circuit having a plurality of inputs to obtain information on power consumption of the circuit responsive to signals applied to the plurality of inputs;
grouping the plurality of inputs into groups of at least one input based on a commonality of power consumption of the circuit for the plurality of inputs as determined from the information;
deriving a power transfer function for providing an estimate of power consumption of the circuit responsive to signals applied to the plurality of inputs of the circuit, wherein the transfer function includes a portion for each group of the groups;
wherein the circuit is a circuit of an integrated circuit;
deriving a second transfer function for providing an estimate of power consumption for a second circuit, wherein the second circuit is a circuit of the integrated circuit and has a plurality of inputs;
implementing the first transfer function as a first power monitoring circuit on the integrated circuit, wherein the first power monitoring circuit has a plurality of inputs coupled to the plurality of inputs of the first circuit; and
implementing the second transfer function on the integrated circuit as a second power monitoring circuit on the integrated circuit, wherein the second power monitoring circuit has a plurality of inputs coupled to the plurality of inputs of the second circuit.

23. The method of claim 22 further comprising:
simulating the circuit;
wherein the running at least one test on the circuit includes running the at least one test on the simulated circuit.

24. The method of claim 22 further comprising:
implementing the power transfer function in a third circuit wherein the third circuit includes inputs coupled to the inputs of the circuit.

25. A method of deriving a power transfer function of a circuit, the method comprising:
running at least one test on a circuit having a plurality of inputs to obtain information on power consumption of the circuit responsive to signals applied to the plurality of inputs;
deriving at least one power impulse function from the information, wherein each power impulse response of the at least one power impulse response is representative of at least one input of the plurality of inputs;
deriving power a transfer function from the at least one power impulse function.

26. The method of claim 25 wherein the deriving includes performing frequency domain analysis of the information.

27. The method of claim 25 further comprising:
implementing the power transfer function in a second circuit wherein the second circuit includes inputs coupled to the inputs of the circuit.

28. The method of claim 25 further comprising:
simulating the circuit;
wherein the running at least one test on the circuit includes running the at least one test on the simulated circuit.

* * * * *

UNITED STATES PATENT AND TRADEMARK OFFICE
CERTIFICATE OF CORRECTION

PATENT NO. : 7,363,208 B2
APPLICATION NO. : 10/616842
DATED : April 22, 2008
INVENTOR(S) : Lipeng Cao Page 1 of 1

It is certified that error appears in the above-identified patent and that said Letters Patent is hereby corrected as shown below:

In Column 12, Line 40, Claim No. 25:

Change "deriving power a" to --deriving a power--

Signed and Sealed this

Fourteenth Day of October, 2008

JON W. DUDAS
*Director of the United States Patent and Trademark Office*